United States Patent
VanWiggeren et al.

(10) Patent No.: US 7,023,557 B2
(45) Date of Patent: Apr. 4, 2006

(54) PARALLEL INTERFEROMETRIC MEASUREMENTS USING AN EXPANDED LOCAL OSCILLATOR SIGNAL

(75) Inventors: Gregory D. VanWiggeren, Los Gatos, CA (US); Douglas M. Baney, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 265 days.

(21) Appl. No.: 10/634,358

(22) Filed: Aug. 5, 2003

(65) Prior Publication Data
US 2005/0030544 A1   Feb. 10, 2005

(51) Int. Cl.
*G01B 9/02* (2006.01)
*G01N 21/00* (2006.01)

(52) U.S. Cl. ................ 356/477; 356/484; 356/73.1

(58) Field of Classification Search ........... 356/460, 356/477–479, 484, 73.1
See application file for complete search history.

(56) References Cited

U.S. PATENT DOCUMENTS

| 4,696,061 A | 9/1987 | Labrum |
| 5,946,092 A | 8/1999 | DeFreez et al. |
| 6,750,973 B1 * | 6/2004 | Tan et al. ............ 356/477 |
| 6,766,115 B1 * | 7/2004 | Sorin et al. .......... 398/161 |
| 2005/0117159 A1 * | 6/2005 | Rosenfeldt .......... 356/477 |

* cited by examiner

Primary Examiner—Gregory J. Toatley, Jr.
Assistant Examiner—Patrick Connolly

(57) ABSTRACT

A system for characterizing optical properties of a device under test (DUT) uses an expanded local oscillator signal to perform multiple parallel interferometric measurements. In one system, the expanded local oscillator signal is optically connected to a lens array. The lens array focuses the expanded swept local oscillator signal into multiple beams. The multiple beams are then used in multiple parallel interferometric measurements. The multiple beams may be used as the reference beams or applied to the DUT and used as the test beams depending on the application. The test beams and reference beams are combined to perform the interferometric measurements. In another system, a portion of the expanded local oscillator signal is applied directly to a DUT as the test beam while another portion of the expanded local oscillator signal is used for the reference beam.

25 Claims, 6 Drawing Sheets

PARALLEL INTERFEROMETRIC MEASUREMENTS USING AN EXPANDED LOCAL OSCILLATOR SIGNAL

FIELD OF THE INVENTION

The invention relates generally to the field of optical measurements and measuring systems, and more particularly to a method and system for optical network analysis that utilizes optical heterodyne detection.

BACKGROUND OF THE INVENTION

Heterodyne optical network analysis (HONA) is an interferometric measurement technique for characterizing the linear optical properties of a device under test (DUT) over a desired spectral range. Commercially available HONA instruments are employed to characterize telecommunications-related components, such as fiber Bragg gratings and arrayed waveguide gratings.

Often, these optical components have more than one port that needs to be characterized. In conventional HONA instruments, only one measurement channel is available to characterize a DUT and therefore each port of the DUT must be characterized serially, which is a time consuming process. While it is possible to build a parallel HONA system using multiple cascaded optical splitters that distribute the local oscillator signal of the HONA to multiple receivers, the distribution of the local oscillator signal to each of the receivers using cascaded optical splitters is complicated, expensive, and lossy.

SUMMARY OF THE INVENTION

A system for characterizing optical properties of a device under test (DUT) uses an expanded local oscillator signal to perform multiple parallel interferometric measurements. For example, a local oscillator signal is passed through a beam expander and the expanded local oscillator signal is used in multiple interferometric measurements. An advantage of expanding the local oscillator signal for use in multiple interferometric measurements is that the problems associated with cascaded optical splitters are avoided.

In accordance with the invention, an expanded local oscillator signal is optically connected to a lens array. The lens array focuses the expanded local oscillator signal into multiple beams. The multiple beams are then used in multiple parallel interferometric measurements. The multiple beams may be used as the reference beams or applied to the DUT and used as the test beams depending on the application. The test beams and reference beams are combined to perform the interferometric measurements.

Alternatively, in accordance with the invention, a portion of the expanded local oscillator signal may be applied directly to a DUT as the test beam while another portion of the expanded local oscillator signal is used for the reference beam. The test beams and reference beams are combined to perform the interferometric measurements.

BRIEF DESCRIPTION OF THE DRAWINGS

Throughout the description, similar reference numbers may be used to identify similar elements.

DETAILED DESCRIPTION OF THE INVENTION

A system for characterizing optical properties of a device under test (DUT) uses an expanded local oscillator signal to perform multiple parallel interferometric measurements. For example, a swept local oscillator signal is passed through a beam expander and the expanded swept local oscillator signal is used in multiple interferometric measurements.

Figure 1:
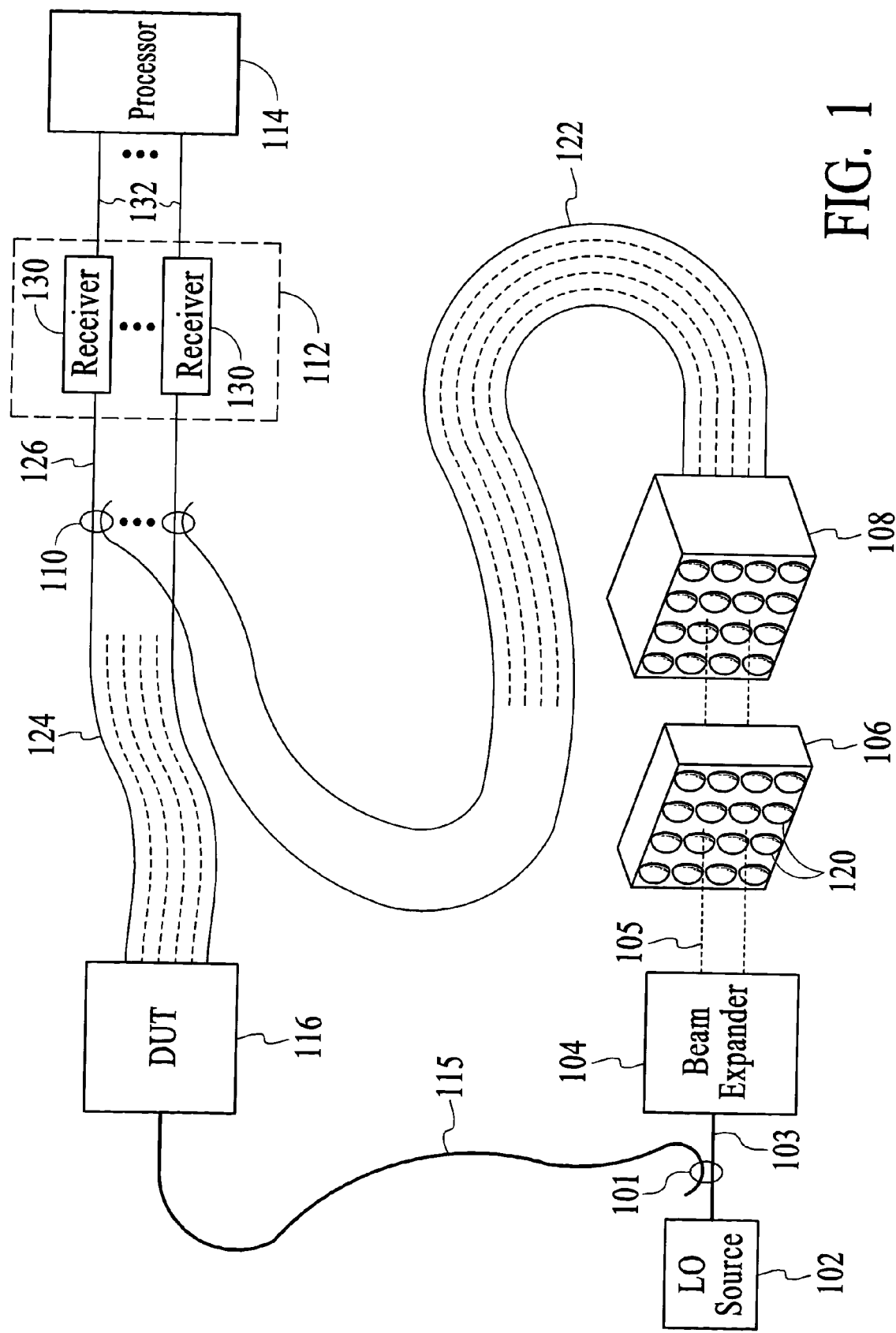
FIG. 1 depicts a system for characterizing a DUT that utilizes an expanded beam to perform multiple parallel interferometric measurements in accordance with the invention.

FIG. 1 depicts an embodiment of a system for characterizing a DUT that utilizes an expanded beam to perform multiple parallel interferometric measurements. The system includes a local oscillator source 102, a beam expander 104, a lens array 106, a coupling system 108, multiple optical couplers 110, a detection system 112, and a processor 114. A DUT 116 is connected to the system so that optical properties of the DUT can be characterized.

Referring to FIG. 1, the local oscillator source 102 generates a local oscillator signal. In an embodiment, the local oscillator source is a highly coherent tunable laser that is continuously tunable over a wavelength range of one nanometer or greater. During optical network analysis, the local oscillator source generates a highly coherent local oscillator signal that can be continuously swept across a range of frequencies, or wavelengths, in order to characterize optical properties of the DUT over the range of frequencies or wavelengths. In an embodiment, the sweep rate of the local oscillator signal at 1,550 nanometers is approximately 40 nm/s or 6.15 MHz/$\mu$s and the sweep range is approximately 100 nm, however the sweep rate and sweep range can be higher or lower.

The beam expander 104 is optically connected to the local oscillator source 102 to receive the swept local oscillator signal. The beam expander generates an expanded swept local oscillator signal 105. For example, the expanded swept local oscillator signal is a spatially expanded and collimated free-space optical beam. A beam expander could be implemented with, for example, a lens, multiple lenses, or a Keplerian telescope.

The lens array 106 is optically connected to the beam expander to receive the expanded swept local oscillator signal 105. The lens array focuses the expanded swept local oscillator signal into multiple beams, for example, multiple distinct beams. In an embodiment, the lens array focuses the expanded swept local oscillator signal into a number of beams that coincides with the number of parallel interferometric measurements that are to be performed. The focused beams are then coupled to distinct waveguides such as optical fibers or planar waveguides. The lens array may include an array of lens elements 120, such as diffractive lenses that are formed on a fused quartz substrate using, for example, photolithographic and chemical etching processes. In an embodiment, the lens elements are scaled to align with the spacing of optical fibers in the coupling system. The lens array may be referred to as "a micro lens array." In an embodiment, the lens array is fabricated to create beams with particular characteristics.

The coupling system 108 functions to couple the beams of the expanded swept local oscillator signal from the lens array 106 into distinct waveguides (e.g., optical fibers). In an embodiment, the coupling system includes a structure for holding a two-dimensional array of optical fibers 122 in alignment with the beams from the lens array. In another embodiment, the coupling system includes a structure for holding a two-dimensional row array of optical fibers (often referred to as a "ribbon connector"). Ribbon connectors are often used to couple light into fiber optic ribbon cables. Fiber optic ribbon cables typically consist of a linear array of multiple individual fibers that are bound together by, for example, connected plastic sheaths. The tight tolerances on the location of the fibers in a fiber optic ribbon connector make fiber optic ribbon connectors well suited for repeatable and low-loss coupling with a lens array. Another embodiment of the coupling system includes an array of integrated optical waveguides that are aligned to the beams from the lens array. Each waveguide is coupled to a single-mode optical fiber at its output using known techniques for connecting optical fibers to waveguides. Although two examples of coupling systems are described, other coupling systems could be used to connect light from the lens array with fiber optic cables that are connected to the couplers.

The multiple couplers 110 connect optical fibers 124 from the DUT 116 with optical fibers 122 from the coupling system 108. The couplers cause light from the DUT and light from the lens array 106 to be combined into multiple combined optical signals that can be used for multiple parallel interferometric measurements. The optical couplers may be optically directional 3 dB fiber couplers, although other optical couplers may be utilized. In an embodiment, the optical couplers are substantially independent of the wavelength and polarization of the light from the DUT and the lens array. In an embodiment, the optical couplers are single mode optical couplers.

The multiple couplers are connected to the detection system 112 by multiple optical fibers 126 (referred to as "output fibers"). The output fibers may be single mode optical fibers that carry the combined optical signals from the optical couplers 110 to the detection system.

In the embodiment of FIG. 1, the detection system 112 includes multiple optical receivers 130 that are optically connected to the multiple couplers 110 on a one-to-one basis. The multiple optical receivers receive the combined optical signals from the multiple optical couplers. The multiple optical receivers produce electrical output signals in response to the combined optical signals. In an embodiment, the optical receivers utilize square law detection, which results in mixing of the combined optical signals from the DUT and the lens array. Because the local oscillator signal is swept and because of the differences in path lengths between the reference path and the test path, mixing of the two optical signals produces a heterodyne beat signal at a frequency that is equal to the frequency difference between the two optical signals. In an embodiment, the heterodyne beat signals from the multiple optical receivers are provided to the signal processor 114 via electrical connections 132.

Although FIG. 1 depicts one arrangement for achieving parallel measurements, other arrangements are possible. For example, multiple optical fibers 124 from the DUT can be coupled to a single fiber 122 from the coupling system 108 and resulting heterodyne beat signals could be individually identified, for example, at the processor through digital data processing.

Although in the embodiment of FIG. 1 the couplers 110 provide a single combined optical signal to the optical receivers 130, other embodiments may involve providing multiple portions of the combined optical signals to the corresponding receivers. For example, two portions of a combined optical signal may be provided to two receivers to achieve polarization diversity and four portions of the combined optical signal may be provided to four receivers to achieve noise balance and polarization diversity.

The processor 114 includes a multifunction processor that receives the output signals from the optical receivers 130 and generates outputs that are indicative of optical characteristics of the DUT 116. The processor may include analog signal processing circuitry, digital signal processing circuitry, or software or any combination thereof, as is known in the field of signal processing. In the embodiment of FIG. 1, the processor receives digital heterodyne beat signal data from the optical receivers and the processor performs digital processing. In an alternative embodiment, the processor receives analog heterodyne beat signals from the optical receivers and the analog signals are converted into digital data by the processor. The digital data is subsequently processed to generate an output that is indicative of one or more optical characteristics of the DUT.

In the embodiment of FIG. 1, the DUT 116 is an arrayed waveguide grating (AWG) that divides a single incoming beam into multiple outgoing beams. The DUT is optically connected to the local oscillator source 102 via coupler 101 and fiber 115. Although in the example of FIG. 1 the DUT is an AWG, the DUT may be any optical device that has multiple ports that are to be characterized using parallel interferometric measurements such as a multiplexer or a demultiplexer that is based on fiber Bragg grating (FBG) or thin film filter technology.

Operation of the system depicted in FIG. 1 is described for an AWG that outputs multiple output beams in response to a single input beam. Operation begins with a swept local oscillator signal being generated by the local oscillator source 102. The swept local oscillator signal is then directed by various optical path elements along two optical paths. With reference to the optical path that includes the DUT 116, the generated swept local oscillator signal is provided to the DUT via optical fiber 115. In response to the received swept local oscillator signal, the DUT outputs multiple beams of light into the optical fibers 124 that are connected to the DUT. The beams of light that are output from the DUT (referred to herein as "test beams" or "test signals") travel to associated ones of the multiple optical couplers 110. With reference to the optical path that includes the lens array, the swept local oscillator signal is initially provided to the beam expander 104 via optical fiber 103. In response to the received swept local oscillator signal, the beam expander outputs an expanded swept local oscillator signal 105. The expanded swept local oscillator signal is then provided to the lens array. The lens array focuses the expanded swept local oscillator signal into multiple beams. The multiple beams of the expanded swept local oscillator signal (referred to herein as "reference beams" or "reference signals") are then provided to the coupling system 108. The coupling system couples the reference beams into multiple optical fibers 122.

The reference beams travel through the multiple optical fibers 122 to the multiple couplers 110, where the reference beams are combined with the test beams from the DUT 116. For example, in the embodiment of FIG. 1, the reference beams are combined with the test beams on a one-to-one basis at the associated couplers. The combined optical signals are output onto the output fibers 126 and travel to the multiple optical receivers. The combined optical signals are detected and mixed by the optical receivers and heterodyne beat signals are generated in response to the combined optical signals. The heterodyne beat signals are output to the processor. The processor utilizes the heterodyne beat signals to generate outputs that are indicative of optical characteristics of the DUT. As described above, the beam expander and the lens array enable the swept local oscillator signal to be efficiently divided into multiple beams that are used to achieve parallel interferometric measurements.

In an embodiment, the receivers 130 of the detection system 112 may be triggered for detection at different times. For example, the receivers may be triggered for detection one at a time across the range of receivers. In other embodiments, some or all of the receivers may be simultaneously triggered for detection. Whether or not detection occurs one receiver at a time or simultaneously, the multiple interference measurements are considered herein to be performed "in parallel" because all of the ports of the DUT can be characterized without changing the physical setup of the system.

Figure 2:
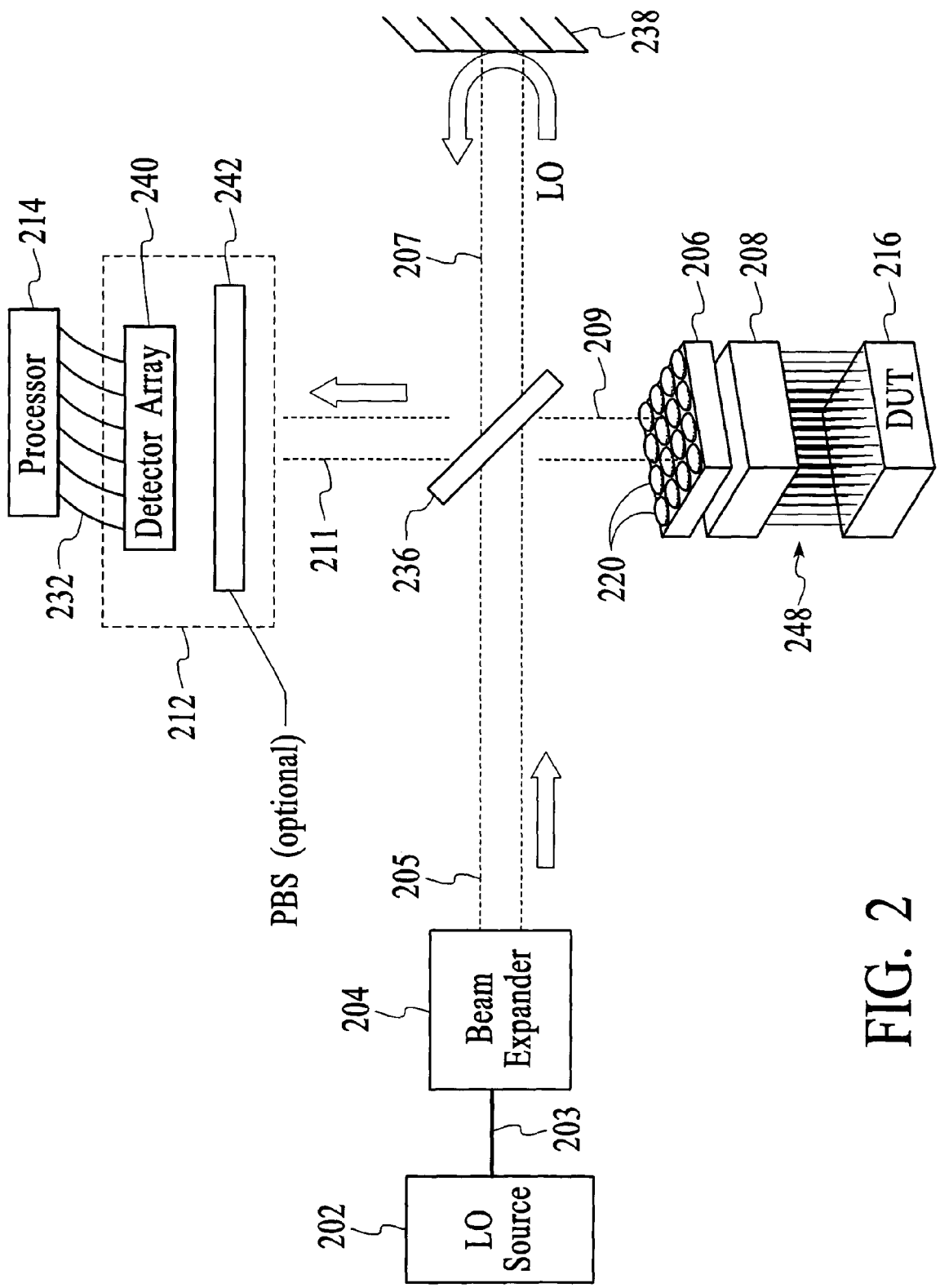
FIG. 2 depicts another system for characterizing a DUT that utilizes an expanded swept local oscillator signal to achieve multiple parallel interferometric measurements in accordance with the invention.

FIG. 2 depicts another embodiment of a system for characterizing a DUT that utilizes an expanded swept local oscillator signal to achieve multiple parallel interferometric measurements. The system includes a local oscillator source 202, a beam expander 204, a beam splitter 236, a mirror 238, a lens array 206, a coupling system 208, a detection system 212, and a processor 214. A DUT 216 is optically connected to the system so that optical properties of the DUT can be characterized.

In the embodiment of FIG. 2, the local oscillator source 202, beam expander 204, lens array 206, and coupling system 208 are similar to the like elements described with reference to FIG. 1. The beam splitter 236 is a partially reflective beam splitter that passes a first portion of the expanded swept local oscillator signal and reflects a second portion of the expanded swept local oscillator signal.

Figure 3:
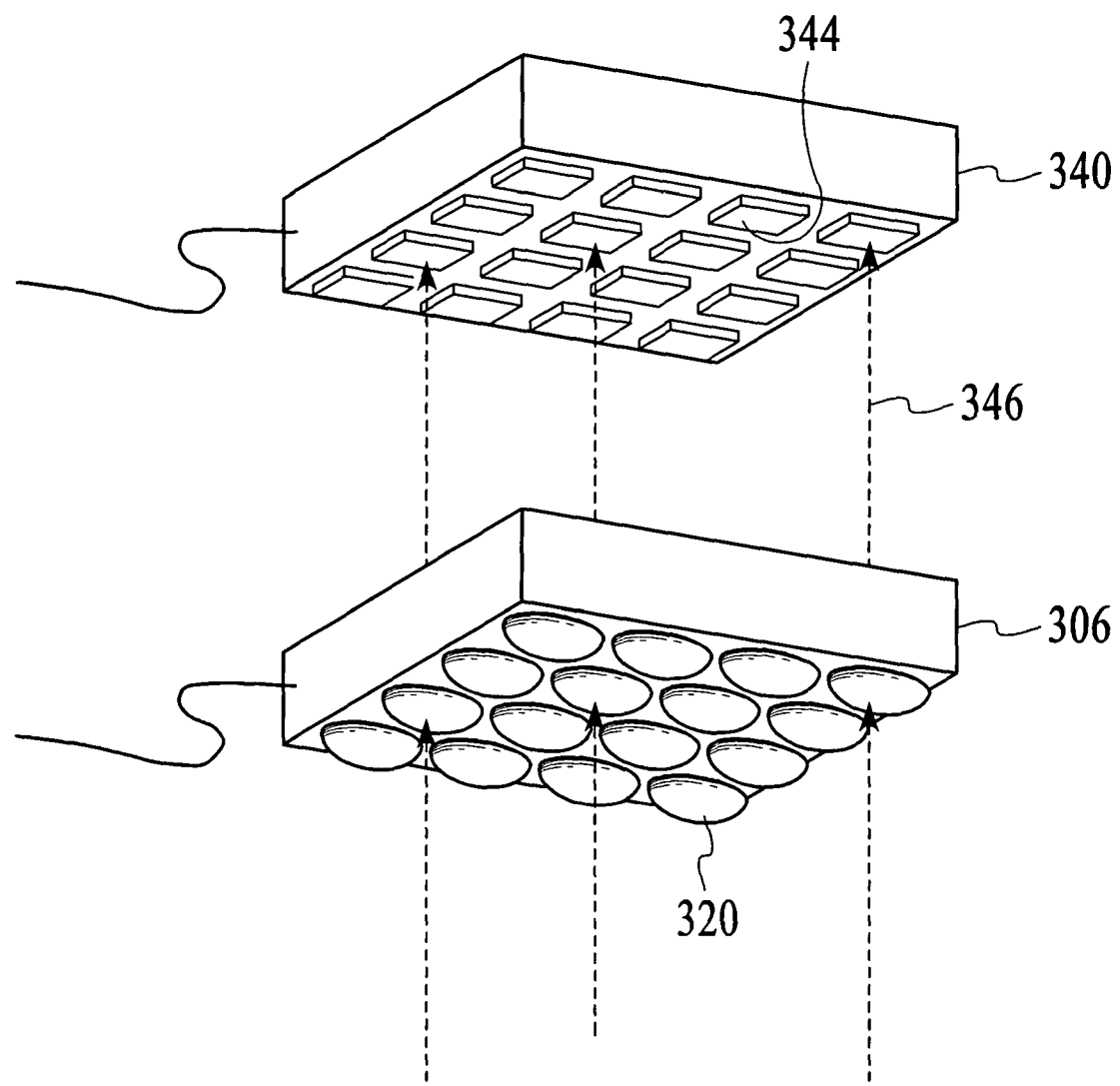
FIG. 3 depicts an example of a detector array and a lens array in which detector elements of the detector array and lens elements of the lens array are optically aligned.

The detection system 212 detects the optical signals that are reflected from the DUT 216 and the mirror 238. In the embodiment of FIG. 2, the detection system includes a two-dimensional detector array 240 and an optional polarizing beam splitter 242. The detector array is designed to have distinct detector elements that are optically aligned with the lens array. For example, a 4×4 lens array would have a corresponding 4×4 detector array having detector elements that are optically aligned to receive focused beams from the lens array 206. FIG. 3 depicts an example of a detector array 340 and a 4×4 lens array 306 in which detector elements 344 of the detector array and lens elements 320 of the lens array are optically aligned such that focused beams of light 346 passing through the lens elements are incident on corresponding detector elements. Additionally, the lens array and detector array may be scaled to correspond with the fiber spacing of the coupling system. In an embodiment, the detector elements may be separated by increased etching to mitigate resistive and capacitive cross-talk between the detector elements. In another embodiment, individual detector elements may be separately fabricated and mounted on a substrate to mitigate resistive and capacitive cross-talk between the detector elements.

Referring back to FIG. 2, the optional polarizing beam splitter is used to achieve polarization diversity and is described in more detail below.

In operation, the local oscillator source 202 in FIG. 2 generates a swept local oscillator signal and the beam expander 204 generates an expanded swept local oscillator signal 205 in response to the swept local oscillator signal. Portions of the expanded swept local oscillator signal are then directed by various optical path elements along two optical paths. Initially, the expanded swept local oscillator signal is provided to the beam splitter 236. The beam splitter splits the expanded swept local oscillator signal into two portions. In the embodiment of FIG. 2, a first portion of the expanded swept local oscillator signal 207 (referred to herein as the "reference beam" or "reference signal") passes through the beam splitter and is incident on the mirror 238. The reference beam is then reflected back to the beam splitter, where it is redirected towards the detection system 212. A second portion of the expanded swept local oscillator signal 209 (referred to herein as the "test beam" or "test signal") is initially redirected by the beam splitter towards the lens array 206. The lens array focuses the test beam (i.e., the expanded swept local oscillator signal) into multiple test beams. The multiple test beams are then provided to the coupling system 208. The coupling system couples the multiple test beams into multiple optical fibers 248. The multiple test beams are then applied to the DUT 216 through the optical fibers 248. In an embodiment, the multiple test beams are applied to multiple ports of a multiport DUT. This system can be used to characterize reflective properties of multiple ports of a DUT in parallel.

Figure 4:
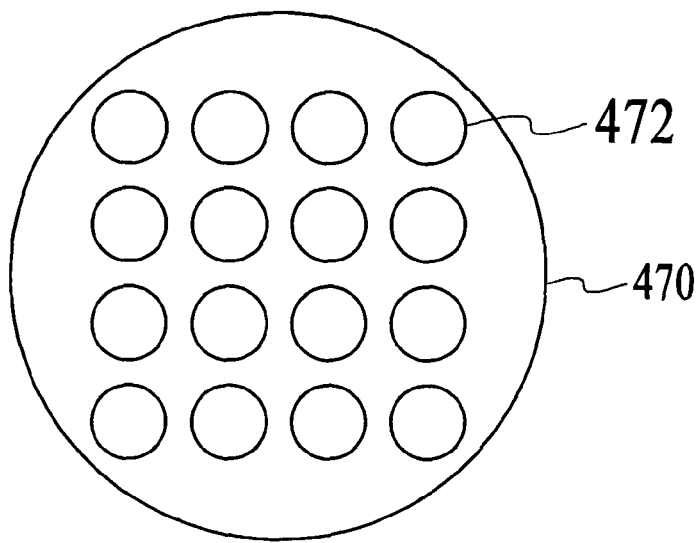
FIG. 4 depicts a reference beam that overlaps with multiple test beams in accordance with the invention.

Portions of the multiple test beams are reflected from the DUT 216 and pass back through the coupling system 208 and the lens array 206. The reflected portions of the multiple test beams are then combined with the reference beam at the beam splitter 236. For example, the multiple test beams "co-propagate" or overlap with the reference beam. The test beams and the reference beams co-propagate because the reference beam includes collimated light throughout the area that includes all of the test beams. For example, FIG. 4 depicts a reference beam 470 that overlaps with the multiple test beams 472. Referring back to FIG. 2, the combined beams 211 include the multiple test beams and overlapping portions of the reference beam as depicted in FIG. 4. The combined beams are then provided to the detection system 212. The optically aligned detectors of the detector array 240 individually detect the combined beams (e.g., the combination of the reflected portion of a test beam and the expanded reference beam) in parallel to achieve multiple parallel interferometric measurements. In an embodiment, the system may include polarization controllers to align the polarization states of the optical signals to ensure efficient interference at the receivers.

Figure 5:
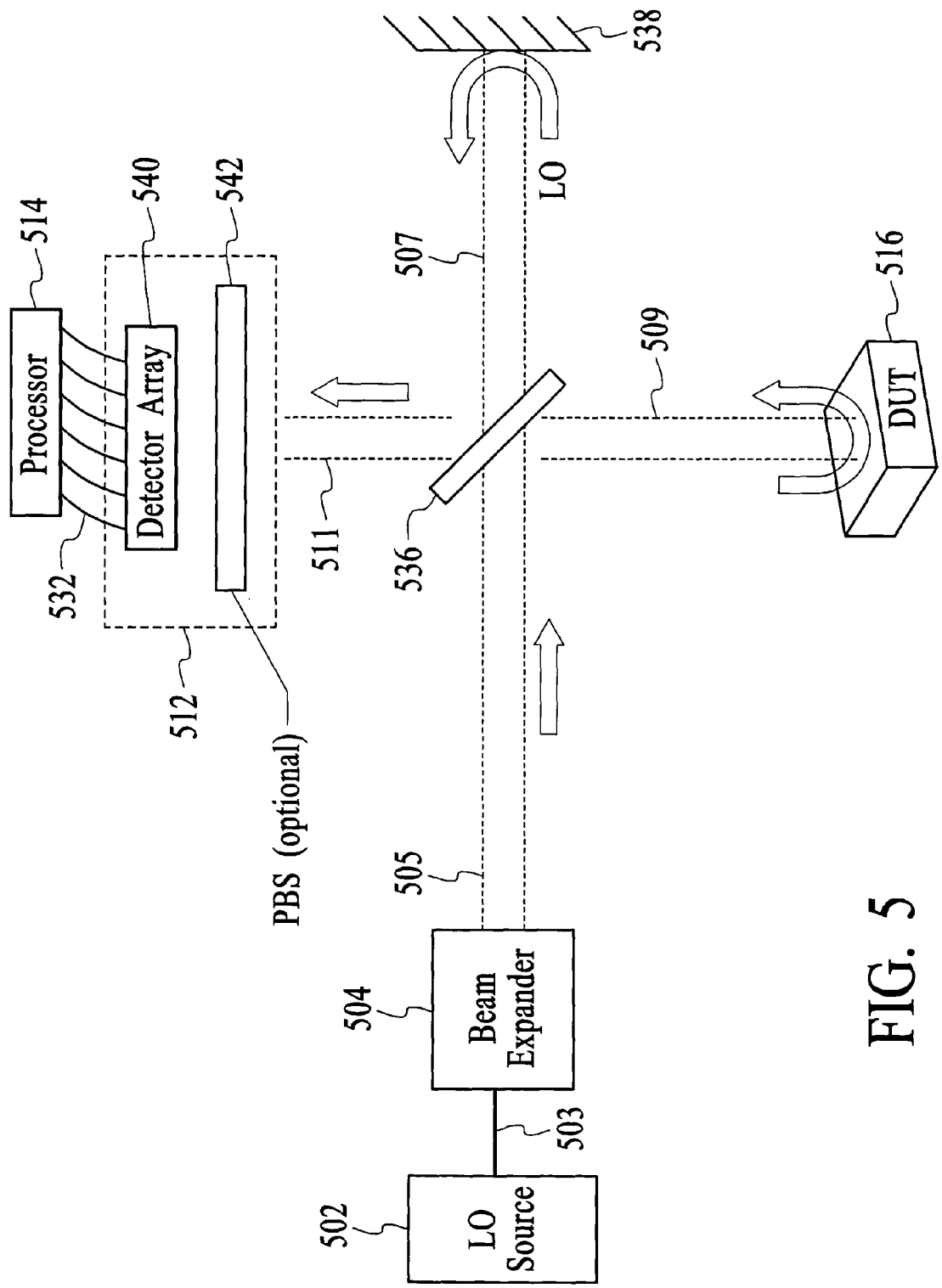
FIG. 5 depicts another system that can be used to characterize a DUT using an expanded swept local oscillator signal to achieve multiple free-space parallel interferometric measurements in accordance with the invention.

A system that is similar to the system of FIG. 2 can be utilized to characterize a DUT using an expanded swept local oscillator signal to achieve multiple free-space parallel interferometric measurements. FIG. 5 depicts an embodiment of a system that can be used to characterize a DUT using an expanded swept local oscillator signal to achieve multiple free-space parallel interferometric measurements. The system includes a local oscillator source 502, a beam expander 504, a beam splitter 536, a mirror 538, and a detection system 512. A DUT 516 is optically connected to the system so that optical properties of the DUT can be characterized. This system can be used to optically characterize particular points or regions of a DUT. For example, a DUT such as an array of biological or chemical samples could be optically characterized in parallel.

In an embodiment, the detection system 512 includes a detector array 240 having an array of detector elements that are aligned with points or regions of the DUT that are to be characterized. For example, if the DUT includes an array of biological or chemical samples, the detector elements and array of samples would be aligned to correspond to each other. In an embodiment, alignment between the detector array and the DUT is achieved by imaging the DUT. Additionally, the system may include optic elements, such as lenses, which prevent undesired light (i.e., reflected light from other regions of the DUT) from reaching the wrong detectors.

In operation, the local oscillator source 502 generates a swept local oscillator signal and the beam expander 504 generates an expanded swept local oscillator signal 505 in response to the swept local oscillator signal. The expanded swept local oscillator signal is then provided to the beam splitter 536. The beam splitter splits the expanded swept local oscillator signal into two portions. In the embodiment of FIG. 5, a first portion of the expanded swept local oscillator signal 507 (referred to herein as the "reference beam" or "reference signal") passes through the beam splitter and is incident on the mirror 538. The reference beam is then reflected back to the beam splitter, where it is redirected towards the detection system 512. A second portion of the expanded swept local oscillator signal 509 (referred to herein as the "test beam" or "test signal") is initially redirected by the beam splitter towards the DUT 516. Portions of the test beam are reflected from the DUT back towards the beam splitter. The reflected portions of the test beam are then combined with the reference beam at the beam splitter. For example, the reflected portions of the test beam combine with the reference beam because the reference beam is a portion of the expanded swept local oscillator signal that includes collimated light throughout the area that includes the reflected portions of the test beam. In the embodiment of FIG. 5, the combined beams 511 include the reflected portions of the test beam and the reference beam. The combined beams are then incident on the detection system. The aligned detectors of the detection system individually detect each combined beam (e.g., the combination of the reflected portion of a test beam and the expanded reference beam) in parallel to achieve multiple parallel interferometric measurements.

In the embodiments of FIGS. 1 and 2, the size of the expanded swept local oscillator signal (i.e., the cross-sectional area of the expanded swept local oscillator signal) and the specifications of the lens array determine the number of beams that are generated from the expanded swept local oscillator signal. The number of beams that are generated from the expanded swept local oscillator signal corresponds to the number of parallel interferometric measurements that can be performed on a DUT. Similarly, in the embodiment of FIG. 5, the size of the expanded swept local oscillator signal determines the area of a DUT that can be characterized. The area of the DUT that is exposed to the expanded swept local oscillator signal can be related to the number of distinct parallel interferometric measurements that can be performed on the DUT.

Figure 6:
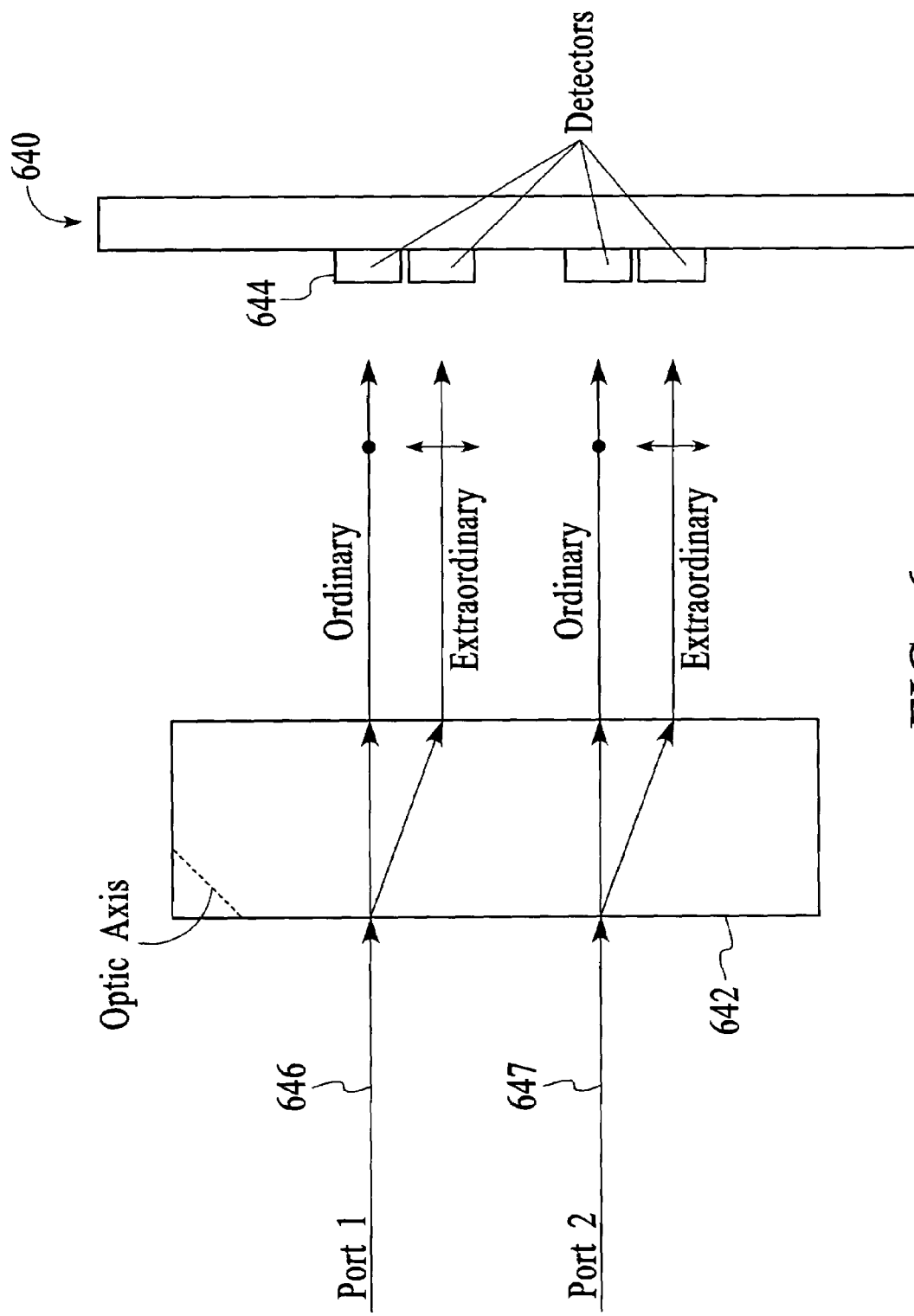
FIG. 6 depicts a polarizing beam splitter and a detector array for use in the systems of FIGS. 2 and 5.

FIG. 6 depicts how the optional polarizing beam splitter 642 can be used to characterize the relative amplitude and phase of the components of the combined optical signals. In the embodiment of FIG. 6, two distinct combined optical signals 646 and 647 (e.g., from two different ports of a DUT) are incident on the polarizing beam splitter. The optical axis of the polarizing beam splitter is oriented such that the beams are divided into two orthogonally polarized components, referred to as the ordinary component and the extraordinary component. The orthogonally polarized components are then detected by detector elements 644 of the detector array 640 that are optically aligned to receive the polarized components. The two detected signals can be used to generate polarization-resolved or polarization diverse measurements. To achieve polarization diverse measurements, the reference beam should be split such that approximately half of the optical signal is polarized in one state while the other half is polarized orthogonally to the first half. This can be achieved by orienting the optical axis of the polarizing beam splitter at 45 degrees to the incoming optical signal.

Figure 7:
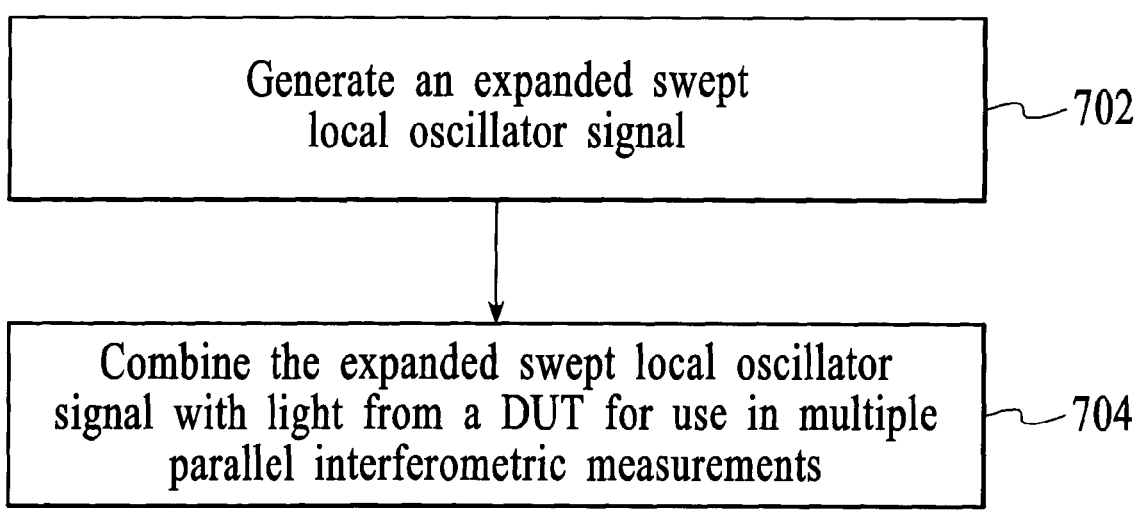
FIG. 7 depicts an embodiment of a process flow diagram for optically characterizing a DUT in accordance with the invention.

FIG. 7 depicts an embodiment of a process flow diagram of a method for optically characterizing a DUT. At block 702, an expanded swept local oscillator signal is generated. At block 704, the expanded swept local oscillator signal is combined with light from a DUT for use in multiple parallel interferometric measurements.

Although specific embodiments in accordance with the invention have been described and illustrated, the invention is not limited to the specific forms and arrangements of parts so described and illustrated. The invention is limited only by the claims.

What is claimed is:

1. A system for optically characterizing a device under test (DUT) comprising:
   a local oscillator source that generates a local oscillator signal;
   a beam expander, in optical communication with said local oscillator source, which generates an expanded local oscillator signal; and
   optical path elements, in optical communication with said local oscillator source, which cause said expanded local oscillator signal to be combined with light received from a DUT for use in multiple parallel interferometric measurements.

2. The system of claim 1 wherein said optical path elements include a lens array connected to receive said expanded local oscillator signal, said lens array outputting multiple beams of said expanded local oscillator signal.

3. The system of claim 2 wherein said optical path elements further include a coupling system, in optical communication with said lens array, which couples said multiple beams of said expanded local oscillator signal to distinct optical waveguides.

4. The system of claim 3 wherein said optical path elements further include multiple optical couplers that are in optical communication with said distinct optical waveguides, wherein said multiple optical couplers combine, into combined optical signals, said multiple beams of said expanded local oscillator signal with light from said DUT.

5. The system of claim 4 further including multiple optical detectors for detecting said combined optical signals in parallel.

6. The system of claim 1 wherein said optical path elements include:
   a beam splitter for splitting said expanded local oscillator signal; and
   a mirror that is in optical communication with said beam splitter to receive a first portion of said expanded local oscillator signal;
   said beam splitter being oriented such that a second portion of said expanded local oscillator signal can be applied to said DUT and such that said first portion of said expanded local oscillator signal is combined with portions of said expanded local oscillator signal that are received from said DUT.

7. The system of claim 6 wherein said optical path elements further include a lens array oriented to receive said second portion of said expanded local oscillator signal, said lens array outputting multiple beams of said second portion of said split expanded local oscillator signal.

8. The system of claim 7 wherein said optical path elements further include a coupling system, in optical communication with said lens array, for coupling said multiple beams that are output from said lens array to distinct optical waveguides, said distinct optical waveguides providing optical coupling to said DUT.

9. The system of claim 7 further including a detector array for detecting, in parallel, combined optical signals, said combined optical signals being formed from said first and second portions of said expanded local oscillator signal.

10. The system of claim 9 wherein said detector array includes multiple detector elements that are optically aligned with lens elements of said lens array.

11. A system for optically characterizing a device under test (DUT) comprising:
a local oscillator source that generates a local oscillator signal;
a beam expander, in optical communication with said local oscillator source, which expands at least a portion of said local oscillator signal; and
a detection system, in optical communication with said local oscillator source and said beam expander, which performs multiple parallel interferometric measurements related to a DUT using said expanded portion of said local oscillator signal.

12. The system of claim 11 wherein said local oscillator source is optically connectable to said DUT for providing a portion of said local oscillator signal to said DUT and wherein said beam expander is in optical communication with a lens array to provide an expanded local oscillator signal to said lens array, said lens array outputting multiple beams of said expanded local oscillator signal in response to said expanded local oscillator signal.

13. The system of claim 12 further including optical couplers, which combine portions of said local oscillator signal that are output from said DUT with said multiple beams of said expanded local oscillator signal that are output from said lens array.

14. The system of claim 13 further including multiple detectors for detecting said combined optical beams in parallel.

15. The system of claim 11 further including:
a beam splitter for splitting said expanded local oscillator signal; and
a mirror that is in optical communication with said beam splitter to receive a first portion of said expanded local oscillator signal;
said beam splitter being oriented such that a second portion of said expanded local oscillator signal can be applied to said DUT and such that said first portion of said expanded local oscillator signal is combined with portions of said expanded local oscillator signal that are received from said DUT.

16. The system of claim 15 further including a lens array oriented to receive said second portion of said expanded local oscillator signal, said lens array outputting multiple beams of said second portion of said expanded local oscillator signal.

17. The system of claim 16 further including a coupling system, in optical communication with said lens array, which couples said multiple beams that are output from said lens array to said DUT.

18. The system of claim 16 wherein said detection system includes a detector array that detects, in parallel, combined optical signals, said combined optical signals being formed from said first and second portions of said expanded local oscillator signal.

19. The system of claim 18 wherein said detector array includes multiple detector elements that are optically aligned with lens elements of said lens array.

20. A method for optically characterizing a device under test (DUT) comprising:
generating an expanded local oscillator signal, the expanded local oscillator signal being a spatially expanded and collimated free-space optical beam; and
combining said expanded local oscillator signal with light from a DUT for use in multiple parallel interferometric measurements.

21. The method of claim 20 further including focusing at least a portion of said expanded local oscillator signal into multiple beams.

22. The method of claim 21 further including combining, into combined optical signals, said multiple beams with light from said DUT.

23. The method of claim 20 further including splitting said expanded local oscillator signal into a reference beam and a test beam.

24. The method of claim 23 further including combining at least portions of said test beams and said reference beam for use in said multiple parallel interferometric measurements.

25. The method of claim 23 further including focusing said test beam into multiple beams.

* * * * *